United States Patent [19]

Matsumoto

[11] Patent Number: 4,752,959
[45] Date of Patent: Jun. 21, 1988

[54] WIRING STATE DETECTING DEVICE FOR VEHICLE

[75] Inventor: Muneaki Matsumoto, Okazaki, Japan

[73] Assignee: Nippon Soken, Inc., Nishio, Japan

[21] Appl. No.: 80,433

[22] Filed: Jul. 29, 1987

[30] Foreign Application Priority Data

Aug. 18, 1986 [JP] Japan .................. 61-192406

[51] Int. Cl.$^4$ .................................................. H04R 29/00
[52] U.S. Cl. ...................................... 381/59; 324/503
[58] Field of Search ............... 324/64, 66, 503, 511, 324/537, 539, 542, 549, 555; 340/310 R, 52 R, 52 F; 379/1, 2, 26; 364/483; 307/10 R; 381/58, 59, 86

[56] References Cited

U.S. PATENT DOCUMENTS 4,100,380 7/1948 Gosswiller ........................ 381/59

Primary Examiner—Reinhard J. Eisenzopf
Assistant Examiner—Anthony L. Miele
Attorney, Agent, or Firm—Cushman, Darby & Cushman

[57] ABSTRACT

A wiring state detecting device for vehicle has an operation control device for supplying power to apparatuses mounted on a vehicle, and operating the apparatuses, a battery mounted on the vehicle, a power supply line for connecting the operation control device to the battery, a wiring state detecting circuit provided in the operation control device for detecting the variation of electric current of the power supply line, discriminating the wiring state between the apparatuses and the operation control device based on the detected variation of electric current, and superposing the discriminated result on the power supply line as wiring state data, and an indicating device provided in the power supply line for receiving and indicating the wiring state data.

10 Claims, 5 Drawing Sheets

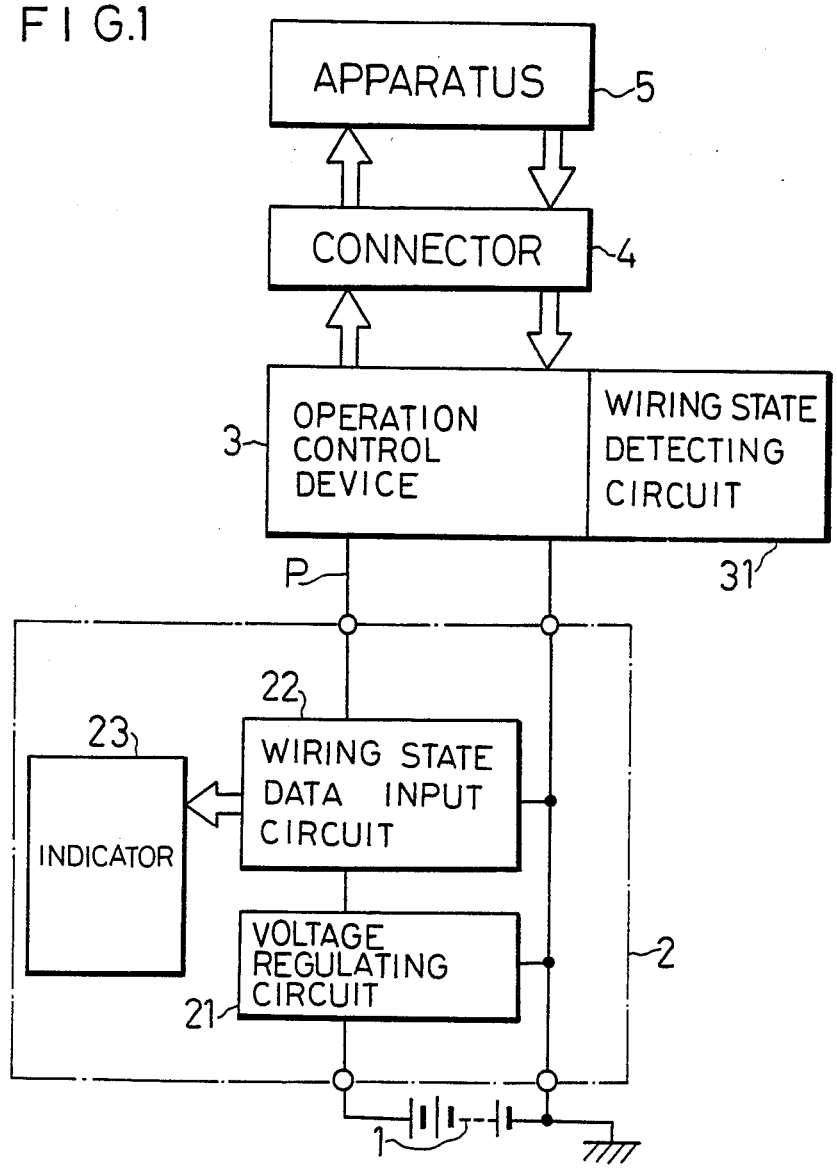
F I G.1

WIRING STATE DETECTING DEVICE FOR VEHICLE

BACKGROUND OF THE INVENTION

1. Field of the Invention

The present invention relates to a wiring state detecting device for vehicle for detecting the wiring state between apparatuses mounted on a vehicle, such as sensors and actuators, and operation control means for controlling the operation of the sensors or the like, and indicating the detected wiring state.

2. Description of the Prior Art

In recent year, car electronics has progressed, and accordingly, EFI control devices and other control devices have been mounted on a vehicle. To these control devices are usually connected a large number of sensors and actuators. When the wiring work is finished in an assembly line, or when the vehicle is inspected, the wiring has been checked on every wire by means of a tester or the like after wires are disconnected from each other.

The above described checking method requires a large number of steps since recently, the number of wires is greatly increased.

SUMMARY OF THE INVENTION

An object of the present invention is to provide a wiring state detecting device by which the wiring state such as disconnection and short circuit can be easily and correctly detected with each apparatus being connected to its operation control device.

The wiring state detecting device for vehicle has operation control means for supplying power to apparatuses mounted on a vehicle, and operating the apparatuses, a battery mounted on the vehicle, a power supply line for connecting the operation control means to the battery, wiring state detecting means provided in the operation control means for detecting the variation of electric current of the power supply line, discriminating the wiring state between the apparatuses and the operation control means based on the detected variation of electric current, outputting the discriminated result to the power supply line as wiring state data, and indicating means provided in the power supply line for receiving and indicating the wiring state data.

According to the wiring state detecting device having the above described structure, by providing only the indicating means in the power supply line between the battery and the operation control device, the wires can be checked speedily and correctly with the apparatus being connected to the operation control device. Particularly, even when a large number of apparatuses are mounted on a vehicle, the number of checking steps can be drastically reduced.

Furthermore, in the wiring state detecting device according to the present invention, the power supply line also acts as a signal line. Therefore, any lead wire or the like for wiring state detection need not be provided.

BRIEF EXPLANATION OF THE DRAWINGS

FIG. 1 is a block diagram illustrating the overall structure of a wiring state detecting device according to the present invention;

DETAILED DESCRIPTION OF THE EMBODIMENTS

Figure 2:
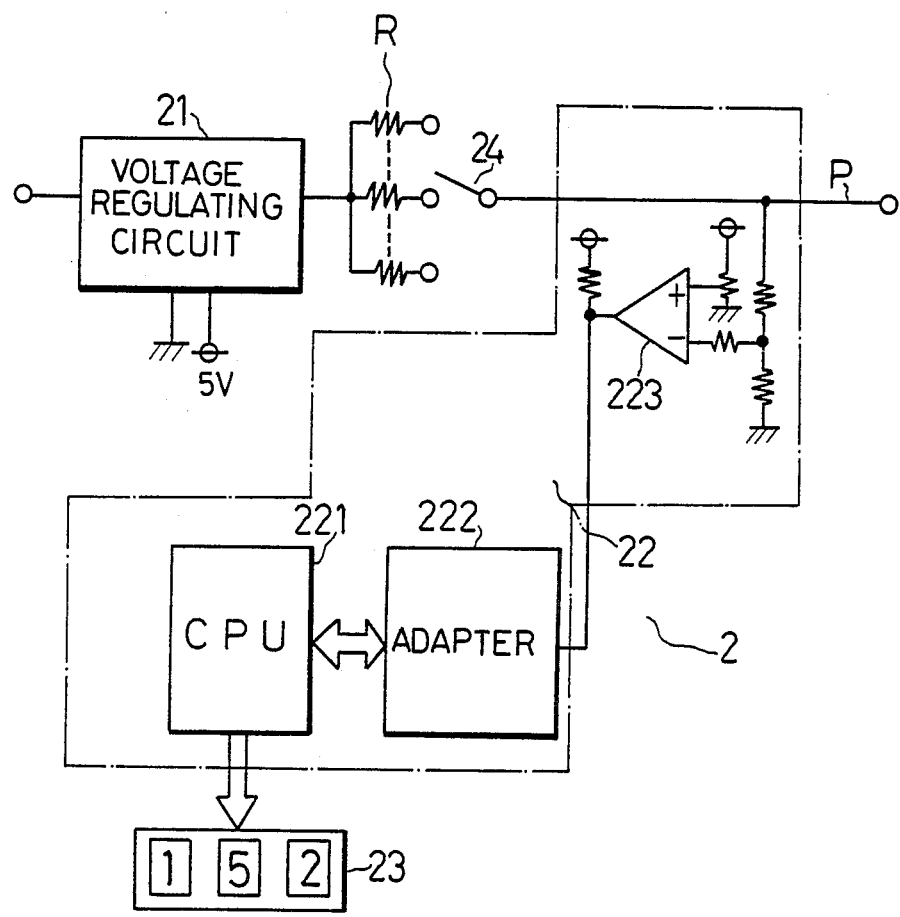
FIG. 2 is a circuit diagram of an indicating device.

FIG. 1 illustrates an overall structure of a wiring state detecting device according to the present invention. A battery 1 mounted on a vehicle is connected to an operation control device 3 mounted on the vehicle by way of a power supply line P. The power supply line P is provided with an indicating device 2 as shown in FIG. 1. The operation control device 3 is provided with a wiring state detecting circuit 31. An apparatus 5 installed in a vehicle is connected to the operation control device 3 through a connector 4. The indicating device 2 is composed of a voltage regulating circuit 21, a wiring state data input circuit 22 and an indicator 23.

When the power of the operation control device 3 is turned on, the wiring state detecting circuit 31 detects the wiring state of the apparatus 5 by the procedure as described later, and the detected wiring state data is outputted and superposed on the power supply line P.

The wiring state data superposed on the power supply line P is inputted to the wiring state data input circuit 22 of the indicating device 2 and indicated on the indicator 23.

Hereinafter, each of the above described circuits will be explained in details.

In FIG. 2, a plurality of resistors R are provided on the output side of the voltage regulating circuit 21 for converting the currect change of the power supply line P to the voltage change. The most suitable resistor is selected out of these resistors R by means of a change-over switch 24 based on the comsumed electric current of the operation control device 3 at its normal operation time.

The wiring state data input circuit 22 is composed of a microcomputer 221, an adapter for serial-parallel convertion (HD6850 made by Kabushiki Kaisha Hitachi Seisakusho) 222, and a comparator circuit 223 connected to the power supply line P.

When 7 bits of wiring state data of start-stop synchronous system, outputted from the wiring state detecting circuit 31 are superposed on the power supply line P, the wiring state data is picked out by the comparator cirucit 223, converted into parallel data by the adapter 222 and inputted to the microcomputer 221. In the present embodiment, higher 5 bits of the wiring state data are discriminating code for the apparatus 5 and the lower 2 bits of the wiring state data are discriminating code for the wiring state.

When the wire of No. 5 of the apparatuses 5 is broken off, for example, an indicating output "51" is outputted to the indicator 23. When No. 15 of the apparatuses 5 is short-circuited, an indicating output "152" is outputted to the indicator 23. In this case, the lowest digit of the indicating output shows the wiring state. "1" indicates the disconnection of wire and "2" indicates the short cirucit of wire.

The microcomputer 221 is provided with a ROM, a RAM a clock generator, an I/O circuit and the like.

Figure 3:
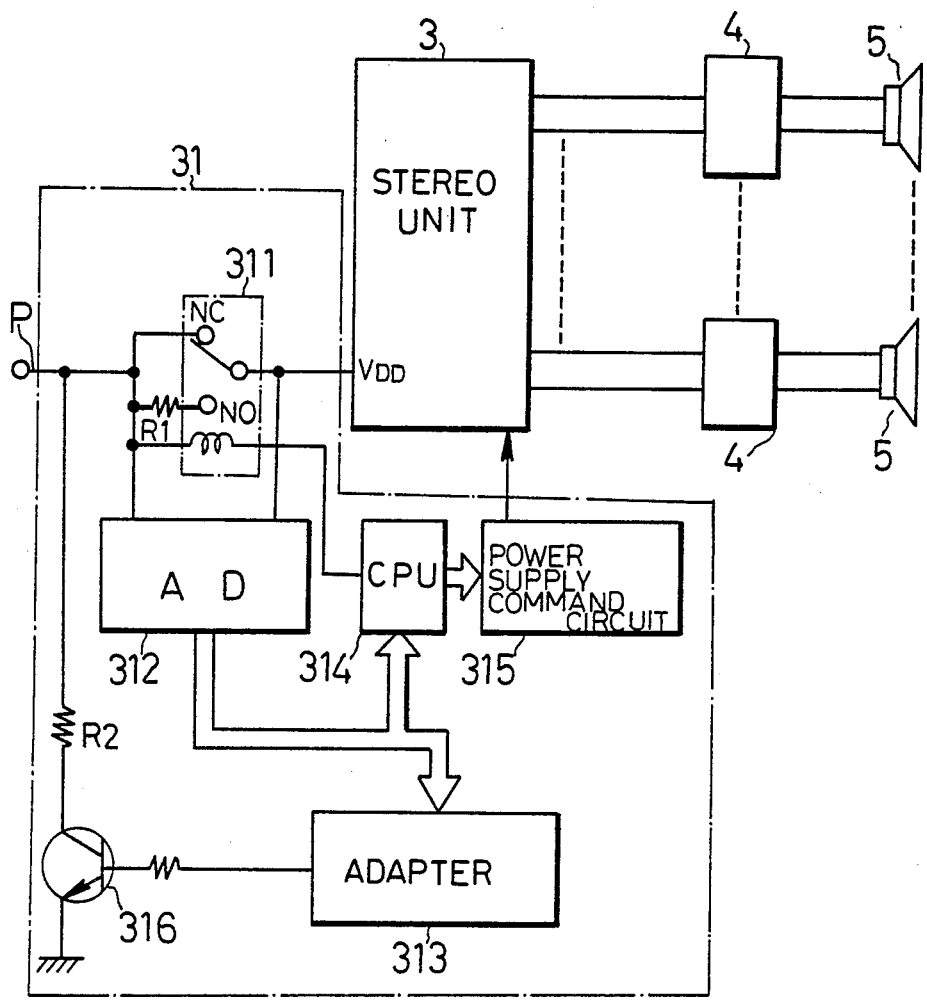
FIG. 3 is a circuit diagram of a wiring state detecting circuit.

In FIG. 3, a stereo unit is used as the operation control apparatus 3. A plurality of speakers 5 acting as the apparatuses are connected to the stereo unit 3 through connectors 4. The wiring state detecting circuit 31 is composed of a relay 311, of which the contact is positioned on the power supply line P, A/D converter 312, an adapter for parallel-serial convertion (HD 6850 made by Kabushiki Kaisha Hitachi Seisakusho) 313, a microcomputer 314, a power supply command circuit 315, and an output transistor 316 connected to the power supply line P through a resistor R2.

The coil of the relay 311 is connectd to the computer 314 so that the relay 311 is operated by the output signal of the computer 314. A normally closed contact NC of the relay 311 is directly connected to the power supply line P and a normally open contact NO of the relay 311 is connected to the power supply line P through a resistor R1. The power supply command circuit 315 commands the stereo unit 3 to selectively supply a constant power to the speaker 5 successively through the output stage of the stereo unit 3 based on the command of the microcomputer 314. Both ends of the contact of the relay 311 is connected to the A/D converter 312 and the output data of the A/D converter 312 is inputted to the microcomputer 314.

Figure 4:
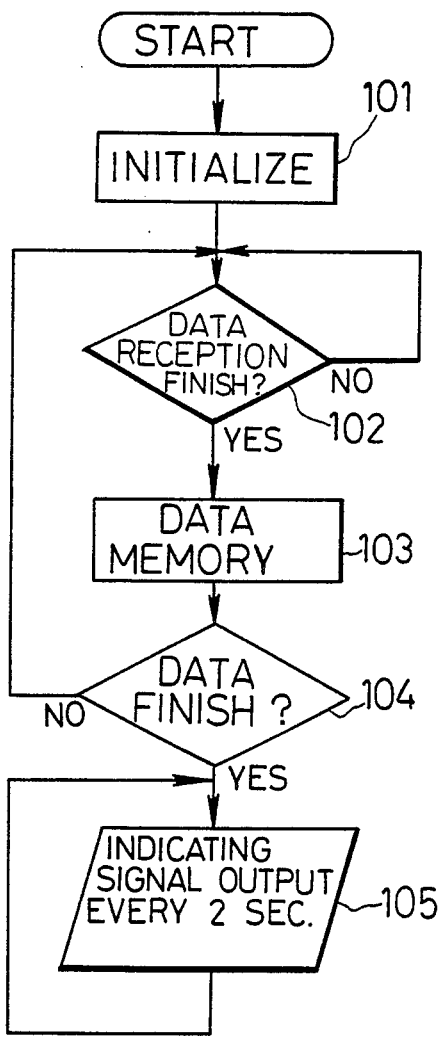
FIGS. 4 and 5 are flow charts of computer programs.

The microcomputer 314 outputs the wiring state data by the procedure as described later. This wiring state data is converted into the serial data in the adapter 313, and then the serial wiring state data passes the transistor 316 and is superposed on the power supply line P. The voltage level of the power supply line P at the time when the wiring state data is superposed thereon, is determined by the resistor R (FIG. 2) and the resistor R2. The microcomputer 314 is operated in accordance with the program flow chart of FIG. 4.

Hereinafter, the operation of the wiring state detecting device will be explained.

The indicating device 2 is connected to the power supply line P between the stereo unit 3 and the battery 1. And then, the power of the voltage regulating circuit 21 is turned on. This results in the computer 221 starting its operation. In Step 101 in FIG. 4, registers and counters of the computer 221, the adapter 222 and the like are initialized. In Step 102, the adapter 222 discriminates whether the receipt of the wiring state data of each speaker is finished or not. When the result is 「No」, the step 102 is repeated. When the result is 「YES」, the program proceeds to Step 103 and the wiring state data is stored. In Step 104, it is discriminated whether the data stored in Step 103 is the finish data as described later or not. When the result is 「No」, the program returns to Step 102, and the next data is received. When the result is 「YES」, the program proceeds to Step 105 and the data stored in the Step 103 is outputted to the indicator 23 as an indicating signal every two seconds. The operation of Step 105 is repeated until the power of the voltage regulating circuit 21 is turned off.

Figure 5:
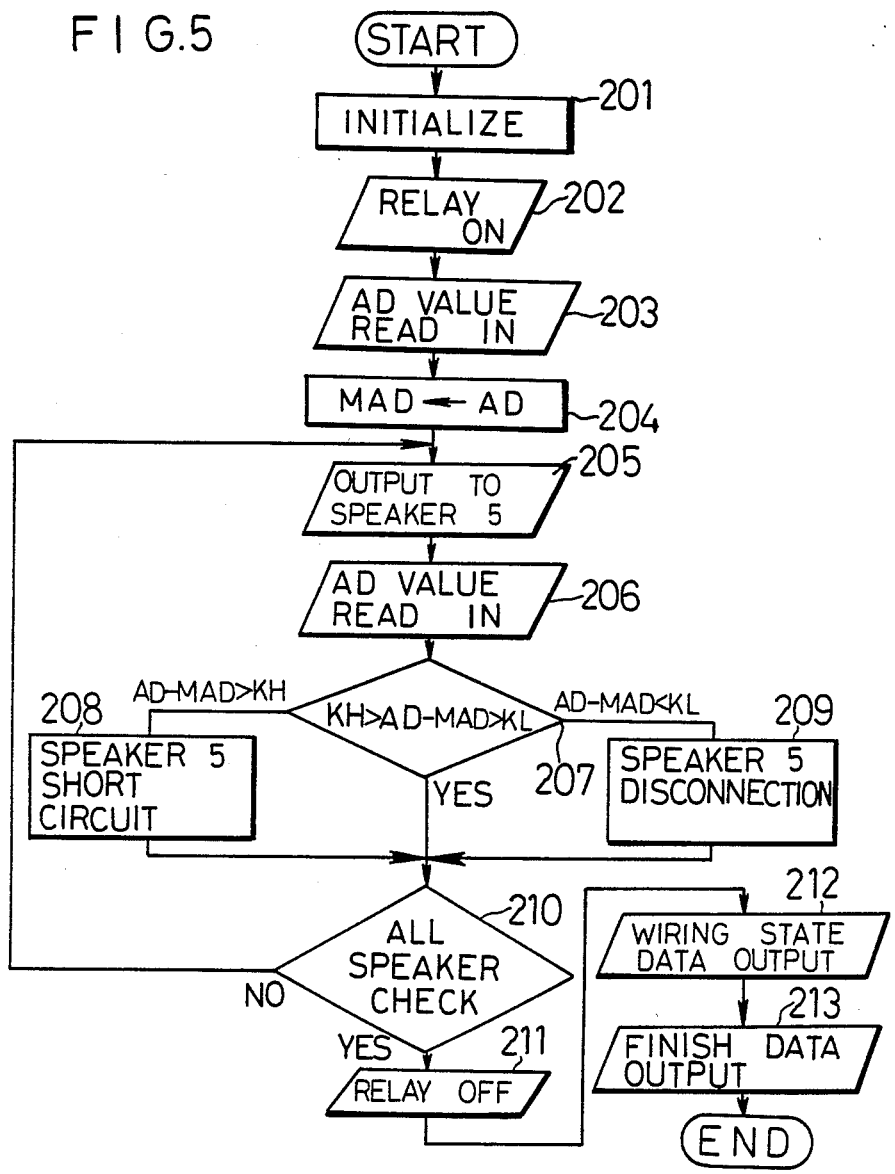

When the power of the voltage regulating circuit 21 is turned on, the computer 314 starts its operation. In Step 201 in FIG. 5, registers, counters and the like are initialized. In Step 202, the relay 311 is energized, and the data AD which is obtained by A/D converting the voltage across the resistor R1, is read in and stored as MAD in Steps 203 and 204. This MAD corresponds to the consumed electric current of the stereo unit 3 in the case that no power is supplied to any speaker 5.

In Step 205, a constat power is supplied to one of the speakers 5 through the power supply command circuit 315. And in Step 206, the data AD at this time, read in and in Step 207, an AD-MAD value obtained by subtracting MAD from AD is compared with an upper limit value KH and a lower limit value KL.

When the AD-MAD value is larger than the upper limit value KH, namely when the electric current flowing through the power supply line S, is excessively increased, the wiring state is discriminated as short circuit. This data is stored with the discrimination code of the speaker 5 as the wiring state date. (In Step 208).

When the AD-MAD value is smaller than the lower limit value KL, the wiring state is discriminated as disconnection and this result is stored with the discrimination code as the wiring state date in Step 209.

When the wiring state detection of every speaker 5 is finished, the relay 311 is deenergized in Steps 210 and 211, and the wiring state data stored in Step 208 or 209 is outputted to the adapter 313 in Step 212.

In Step 213, the finish data indicating the finish of the wiring state detection process is outputted to the adapter 313.

The wiring state data is superposed on the power supply line P through the adapter 313 as described above. The superposed wiring state data is indicated on the indicator 23 after passing the input circuit 22 of the indicating device 2.

As described above, in the wiring state detecting device of the present invention, by only providing an indicating device in the power supply line between the battery and the operation control device, the wiring state can be speedily and correctly checked with apparatus to be detected being connected to the operation control device and without providing any special lead wire for checking.

In the above embodiment, adapters 222, 313 are used for serial-parallel data convertion. In place of these adapters, shift registers (for example TC4014, TC4015 made by Toshiba Corporation) can be used.

A hard logic can be substituted for the microcomputer 221 of the indicating device 2.

By using the EFI control device as the operating control device, the wiring state of an idle speed control valve, a vacuum sensor, an intake air temperature sensor, a cooling water temperature sensor, an exhaust gas temperature sensor, an $O_2$ sensor or the like can be detected.

What is claimed is:

1. A wiring state detecting device for a vehicle comprising:
    operation control means connected to an apparatus mounted on the vehicle for supplying power to said apparatus to operate said apparatus;
    a battery mounted on the vehicle;
    a power supply line connecting said operation control means to said battery;
    wiring state detecting means provided in said operation control means for detecting the electric current change of said power supply line when power is supplied to said apparatus, for discriminating the wiring state between said apparatus and said operation control means from the electric current change, and for superposing the discriminated result on said power supply lines as wiring state data; and
    indicating means provided in said power supply line for indicating said wiring state data.

2. A wiring state detecting device according to claim 1, wherein said wiring state detecting means has storing means for storing an electric current of said power supply line when no power is supplied to said apparatus, as an initial value.

3. A wiring state detecting device according to claim 2, wherein said wiring state detecting means discriminates the wiring state between said operation control means and said apparatus as disconnection when the difference between an electric current of said power supply line at the time when power is supplied to said apparatus and said initial value is not more than a predetermined value.

4. A wiring state detecting device according to claim 2, wherein said wiring state detecting means discriminates the wiring state between said operation control means and said apparatus as short circuit when the difference between an electric current of said power supply line at the time when power is supplied to said apparatus, and said initial value is not less than a predetermined value.

5. A wiring state detecting device according to claim 1, wherein said apparatus is composed of a plurality of apparatuses which are connected to said operation control means, respectively, said wiring state detecting means is provided with power supply command means for commanding said operation control means to supply electric current to said plurality of apparatuses in order, discriminating means for discriminating the wiring state between each of said plurality of apparatuses to which power is supplied, and said operation control means, storing means for storing each of the discriminated results and transmitting means for superposing the discrimianted results of all apparatuses on said power supply line as wiring state data.

6. A wiring state detecting device according to claim 5, wherein said operation control means is a stereo unit and said plurality of apparatuses are speakers.

7. A wiring state detecting device according to claim 1, wherein said wiring state detecting means superposes said wiring state data composed of a train of pulses on said power supply line.

8. A wiring state detecting device according to claim 7, wherein said indicating means has a voltage comparator circuit for picking out said train of pulses superposed on said power supply line.

9. A wiring state detecting device according to claim 8, wherein said wiring state detecting means has a transistor connected to one end of said power supply line in parallel with said operation control means through a resistor for superposing said wiring state data on said power supply line as a train of pulses, and said indicating means has a voltage regulating circuit of which an output end is connected to the other end of said power supply line through a resistor.

10. A wiring state detecting device according to claim 1, wherein said wiring state detecting means has a relay operating when the detecting operation is executed, and a resistor provided in said power supply line for outputting a voltage proportional to the electric current of said power supply line when said relay is operated.

* * * * *